July 6, 1943.   A. T. ANDERSON   2,323,301
HOUSING FOR USE IN TESTING DETONATORS
Filed July 20, 1942
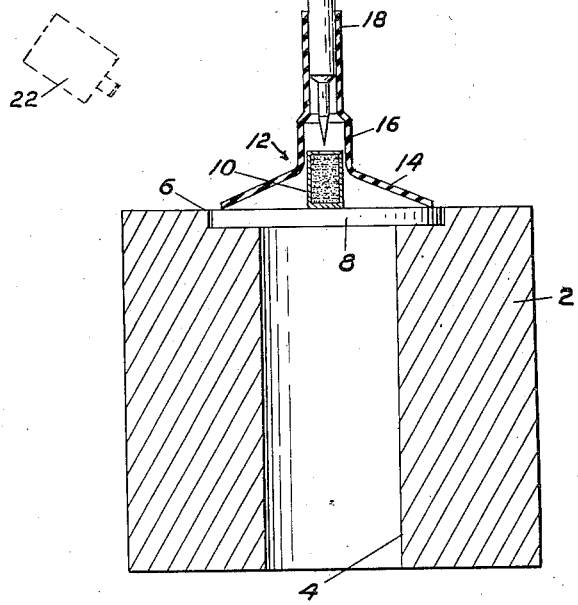
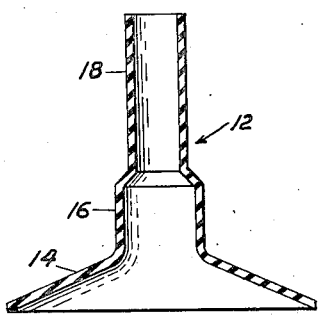
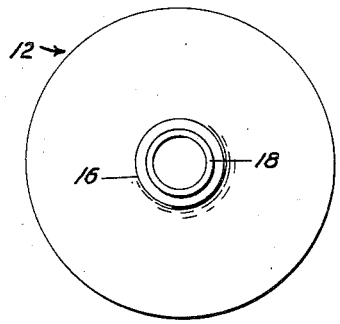
Inventor
Andrew T. Anderson
By G. J. Kessenich, J. H. Church
Attorneys

UNITED STATES PATENT OFFICE 2,323,301

HOUSING FOR USE IN TESTING DETONATORS

Andrew T. Anderson, Dover, N. J.

Application July 20, 1942, Serial No. 451,660

2 Claims. (Cl. 73—51)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a housing for use in the testing of detonators.

One of the problems of testing detonators is that of determining what goes on at the time of detonation, and of being able to see the detonator to control operations before detonation. The problem is solved by providing a transparent housing for the detonator.

An object of the invention is to provide a housing for detonators which will enable observation of operations up to and including the actual detonation. This is achieved by a transparent housing having an open-faced flare at one end, support means for a firing pin at the other end, and a chamber intermediate the ends to receive the detonator or into which the detonator may project. The housing is preferably of any clear molded plastic, such as cellulose acetate or vinyl acetate, which disintegrates upon detonation.

The specific nature of the invention as well as other objects and advantages thereof will clearly appear from a description of a preferred embodiment as shown in the accompanying drawing in which:

Fig. 1 of the drawing is a plan view of the housing of the invention.

Fig. 2 is a longitudinal sectional view of the housing.

Fig. 3 shows the housing in place on a test block, with a detonator and firing pin in place preparatory to setting off the detonator. The parts in Fig. 3 are shown in section.

In the drawing, a test block 2 is shown. This block is of conventional form and design for use in a standard testing machine (not shown). The block is preferably bored as at 4, with a counterbore 6 at one end of bore 4. Counterbore 6 is adapted to receive a lead plate 8 to be used in the standard lead plate brisance test whereby the effect on the lead plate is the measure of brisance.

Substantially centered on plate 8 is a detonator 10 of a type to be tested. A transparent housing 12 made according to the invention, is placed over the detonator. Housing 12 comprises an open-faced flare 14, a narrow chamber 16, and means 18 adapted to hold a firing pin 20. With the parts of the testing equipment in place, as seen in Fig. 3, firing pin 20 is held in place in member 18, and projects downward into the chamber 16. Detonator 10, resting on plate 8, projects upward into chamber 16, into close proximity with firing pin 20.

Housing 12 is a transparent member, and is preferably made of a molded plastic, such as cellulose acetate or vinyl acetate. The transparency of the housing permits observation of the firing pin and detonator for ready adjustment preparatory to firing of the detonator. If desired, a high speed camera, indicated in dotted lines at 22, may be positioned to photograph the detonation.

I claim:

1. A housing for use in testing detonators comprising an integrally formed body of transparent material designed to be fragmented by the force of the explosion of the detonator, and having an upper elongated portion for the reception of a firing pin, said portion merging into a chamber for the reception of the detonator, and a lower open face flared portion.

2. The invention as in claim 1 with a firing pin supported in the upper elongated portion of the body.

ANDREW T. ANDERSON.